United States Patent
Caviedes et al.

(10) Patent No.: US 6,646,673 B2
(45) Date of Patent: *Nov. 11, 2003

(54) COMMUNICATION METHOD AND TERMINAL

(75) Inventors: Jorge E. Caviedes, Yorktown Heights, NY (US); Nermeen M. Ismail, Mountainview, CA (US); Hugo J. Strubbe, Yorktown Heights, NY (US); Max Wu, Ossining, NY (US)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/985,985

(22) Filed: Dec. 5, 1997

(65) Prior Publication Data

US 2003/0145324 A1 Jul. 31, 2003

(51) Int. Cl.[7] .................................................. H04F 7/14
(52) U.S. Cl. ............................... 348/14.07; 348/14.08; 725/10
(58) Field of Search .............................. 348/14–20, 159, 348/14.07, 14.01, 14.08; 455/2; 379/201–206, 93.21; 370/260–269; H04N 7/14, 7/15; H04L 12/16, 11/00

(56) References Cited

U.S. PATENT DOCUMENTS

| | | | | |
|---|---|---|---|---|
| 5,003,532 A | * | 3/1991 | Ashida et al. ................. 370/62 |
| 5,621,429 A | * | 4/1997 | Yamaashi et al. ............ 345/119 |
| 5,657,246 A | * | 8/1997 | Hogan et al. ................. 348/515 |
| 5,684,527 A | * | 11/1997 | Terui et al. .................... 348/15 |
| 5,991,276 A | * | 11/1999 | Yamamoto .................. 370/260 |
| 6,124,881 A | * | 9/2000 | Terui et al. .................. 709/206 |
| 6,326,964 B1 | * | 12/2001 | Snyder et al. ............... 345/419 |
| 6,349,327 B1 | * | 2/2002 | Tang et al. .................. 709/205 |

FOREIGN PATENT DOCUMENTS

JP          05-207456    *  9/1993   ............ H04N/7/15

* cited by examiner

Primary Examiner—Vivek Srivastava
(74) Attorney, Agent, or Firm—Daniel J. Piotroski

(57) ABSTRACT

The invention relates to a communication method and a terminal (500) for use with such a method. The method uses at least two interconnected terminals (402, 404), at which input data from associated participants is captured. The input data comprises at least video and/or audio data. A monitoring unit (530) derives activity information about the participants from the input data. The monitoring unit (530) is either located in one terminal (402) for centrally deriving the activity information, or present in all terminals (402, 404) for, at least partly, deriving the activity information locally. The activity information is subsequently visualized in the form of tables and/or diagrams or by manipulating the windows in which the participants are displayed. Also this visualization step can be performed only at a central terminal (402) or at the terminal of each participant (402, 404). The activity information comprises for instance talking time and a number of key strokes of the participant.

24 Claims, 3 Drawing Sheets

COMMUNICATION METHOD AND TERMINAL

FIELD OF THE INVENTION

The invention relates to a communication method using at least two interconnected terminals, the method comprising the step of collecting input data from a participant associated with one of the at least two interconnected terminals, the input data comprising at least video and/or audio data. The invention further relates to a terminal for use in such a method.

BACKGROUND OF THE INVENTION

Such a method is applied in various multi-user communication systems such as groupware systems, distance learning systems and videoconferencing systems. A groupware system supports collaborative work among a number of remote workers. Distance learning systems are used for enabling students and teachers to attend and give lectures without the requirement of physically being in the same room or even the same building. Probably most widely spread nowadays are videoconferencing systems. They allow people to have meetings without being restricted by the conference location.

The success of such systems depends on whether effective communication sessions can be established. Therefore, a lot of research has been done for the purpose of increasing effectiveness of such multi-user communication systems. As an example, reference is made to a videoconferencing system that is described in U.S. Pat. No. 5,675,374. The known system aims at establishing a videoconference which closely resembles a conference which is held at a single location.

SUMMARY OF THE INVENTION

It is an object of the invention to provide an improved communication method. To this end, a communication method according to the invention comprises the step of deriving activity information about the participant from the input data.

The invention is based on the recognition that a problem in existing communication systems is that with plain video and/or audio data it is hard to build a mental image of the participants in a communication session. Such an image comprises different relevant characteristics of the participants based on many objective and subjective criteria. For example, an instructor wants to know which of his students are passive, active, dominative, talkative, etc. It has been found that it is much harder to build such a mental image with a distance learning system than in the face-to-face situation of a class room. This may be due to the fact that the instructor must filter out superfluous video information from multiple sources and perform monitoring tasks mentally while the learning and teaching processes are going on.

Furthermore, compared to a face-to-face communication session, aspects like natural authority, etc. are much harder to convey. Firstly, some of such characterizing information might not even be captured by conventional input units. Secondly, what is captured easily gets lost in the flood of data the participants get to digest.

A particularly distinctive characteristic of a participant is his or her contribution to the session. Monitoring the contribution of the participant to the session requires constant attention to the input data he or she produces. The problem is similar in a video and in a telephone conference. With regard to the latter, as you cannot see which of the participants is speaking, it is hard to identify their respective contributions to the session. The required effort further increases with an increasing number of participants.

Activity information may include audio, mouse and keyboard activity plus other input device activity. Moreover, data on student feedback, agenda status, and audio and floor control activity can also be used.

The derived activity information can be used in several ways. Firstly, the activity information can be stored in a database for analysis after completion of the session. This enables monitoring the contribution of the participants off-line. Furthermore, by time-stamping the activity information during the deriving step, a history of the session is constructed. The activity information can further be used to index, store and retrieve sessions, or parts of them. Secondly, the activity information can be visualized immediately during the session. Thus, the activity information can directly influence the course of the session. Hereto, the method further comprises the step of visualizing the activity information in the form of a table and/or a diagram. Alternatively, the method comprises the steps of displaying the participant on a display unit in a window having window properties and manipulating the window properties on the basis of the activity information. With such dynamic display management a dynamic visual environment is created allowing on the fly monitoring and tracking participants. Either way of visualizing the activity information increases the virtual presence without adding extra effort for the participants. No manual actions are required. The visualized activity information provides an instrument for building a mental image of the participants. Other ways of visualizing the activity information can be imagined. Advantageously, the manner how the activity information is actually visualized could be made at least partly user programmable in order to suit user preferences.

Advantageously, the activity information deriving step comprises the step of measuring talking time of the participant. In most kinds of communication sessions, talking time will give a very good indication of the contribution of a participant. Moreover, measuring talking time based on the acquired audio data is a relatively simple operation.

Advantageously, the activity information deriving step comprises the step of counting a number of input device operations like key strokes or mouse manipulations made by the participant. The step of deriving the number of input device operations can be performed with very little effort. The most logical location to perform this step is at the terminal of the participant being monitored.

Advantageously, the at least two interconnected terminals comprise a facilitator terminal and at least one client terminal, and the activity information deriving step comprises the steps of obtaining the activity information at the at least one client terminal and sending the activity information to the facilitator terminal. As compared to an alternative method in which the activity information is derived centrally, this approach allows the number of participants to the session to increase without the processing capacity of the facilitator terminal becoming a bottleneck. A third option for performing the activity information deriving step is to do it partly at the client terminals and partly at the facilitator terminal. For example, the number of key strokes is counted locally at the client terminals and the talking time is measured centrally at the facilitator terminal.

Advantageously, after the activity information is sent to the facilitator terminal, the latter can subsequently distribute the activity information to the participants for visualization. In this way, not only the facilitator but also the other participants benefit from the activity information.

These and other aspects of the invention will be apparent from and elucidated with reference to the embodiments described hereinafter.

The invention is further explained below by way of example, with reference to the accompanying drawings.

DETAILED DESCRIPTION OF THE EMBODIMENTS

Figure 1:
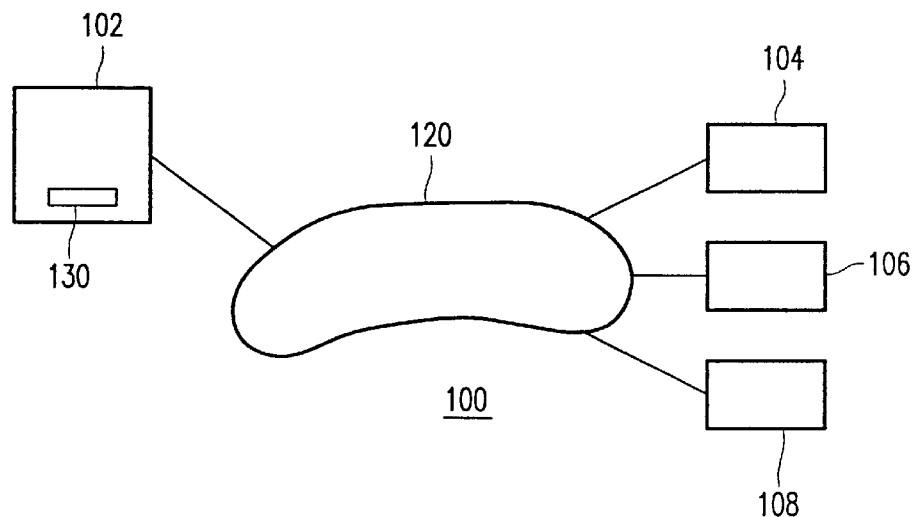
FIG. 1 shows an embodiment of a communication system in which the communication method of the invention can be used.

FIG. 1 shows an embodiment of a communication system 100 in which the communication method of the invention can be used. It shows a facilitator terminal 102 that is connected through an interconnection network 120 with a number of client terminals 104, 106, 108. The facilitator terminal 102 is intended to be used by a person having a facilitating function (facilitator) during a communication session: a teacher, a chairman, etc. Here it is assumed that he or she actively participates in the session. Alternatively, the facilitator only monitors the session.

Each terminal 102, 104, 106, 108 comprises as input devices a camera, a microphone and a keyboard for enabling an associated user to supply input data in the form of video, audio and text. All the input data is collected by the facilitator terminal 102 and subsequently redistributed to the client terminals 104, 106, 108. Alternative ways of distributing the input data among the terminals 102, 104, 106, 108 can be imagined. For example, if there is only a single client terminal, the redistributing step might not be necessary. Each terminal 102, 104, 106, 108 comprises as output unit a display and a speaker for producing video and audio data originating from users at remote terminals.

So far, the system 100 matches a conventional videoconferencing system. In accordance with an embodiment of the present invention, the facilitator terminal 102 further comprises a monitoring unit 130 for deriving user activity information from the remote input data that it receives from the client terminals 104, 106, 108 and from the local input data that is produced at the input units of the facilitator terminal 102 itself. Hereto, the monitoring unit 130 analyzes all incoming input data. During a communication session, at the facilitator terminal 102 activity information is derived by continuously determining which one of the participants is talking. After the activity information is stored in a database that is operated via the facilitator terminal 102, the results are visualized on a display unit of the facilitator terminal 102 by means of graphs, charts and tables. In this process, the input data that is produced at the facilitator terminal 102 is handled in the same way as input data that is produced at the client terminals 104, 106, 108, so that also the contribution of the facilitator is visualized.

Figure 2:
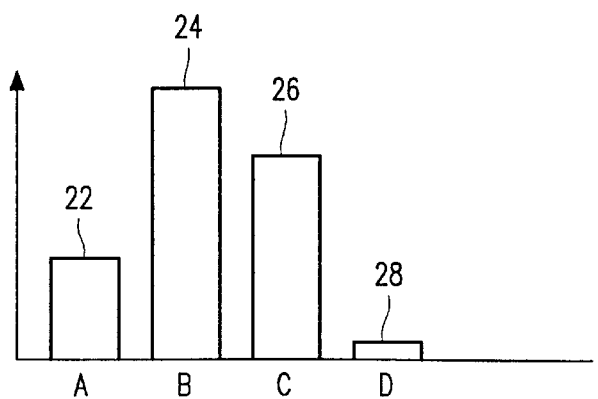
FIG. 2 shows a chart visualizing activity information as obtained with the method of the invention.

FIG. 2 shows a chart visualizing activity information as obtained with the method of the invention. Each bar 22, 24, 26, 28 is associated with a respective one of four participants (including the facilitator), and indicates an amount of talking time of that participant. During the session, the chart is regularly updated so that at any time the facilitator can determine the cumulative verbal contribution of each participant with one look at the chart. It will be clear that the same information can also be presented to the facilitator by means of a table.

Figure 3:
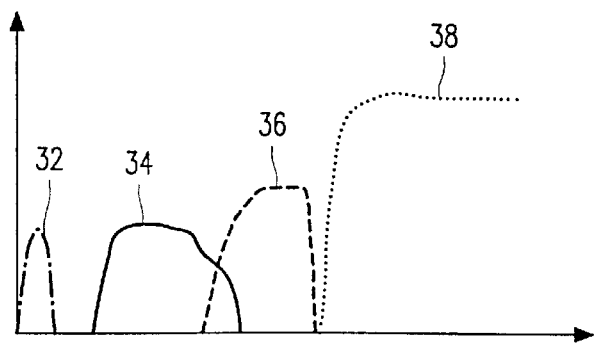
FIG. 3 shows a graph visualizing activity information as obtained with the method of the invention.

FIG. 3 shows a graph visualizing activity information as obtained with the method of the invention. Each curve 32, 34, 36, 38 is associated with a respective one of four participants and indicates an audio volume of that participant versus time. At the time the graph was made, the participant associated with curve 38 was speaking. Additionally, based on the derived activity information, it can be visualized in the graph (e.g. by means of colors) whether there is an argument, a lively discussion, a monolog, etcetera. This can further reduce the cognitive load on the facilitator.

Figure 4:
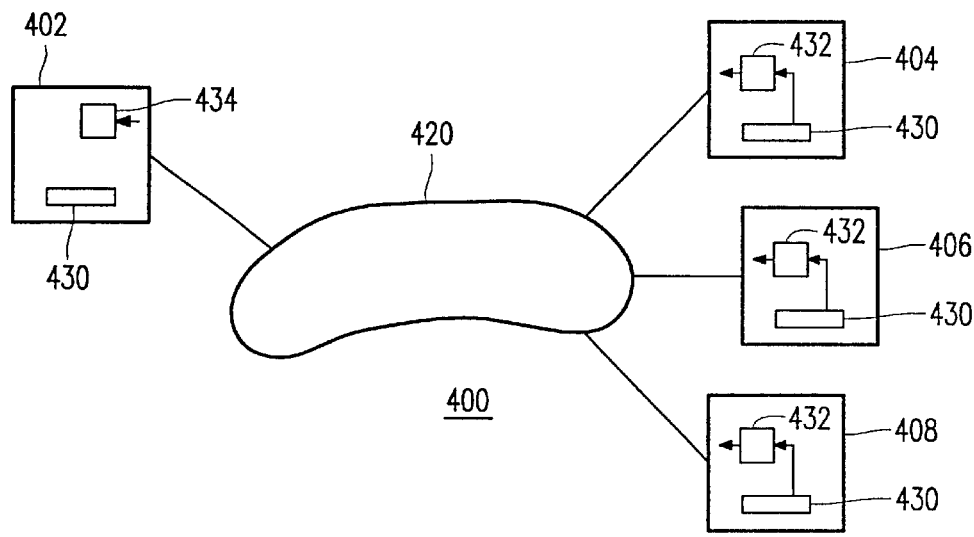
FIG. 4 shows an alternative embodiment of a communication system in which the communication method of the invention can be used.

FIG. 4 shows an alternative communication system 400 in which the communication method of the invention can be used. It shows a facilitator terminal 402 that is interconnected through an interconnection network 420 with a number of client terminals 404, 406, 408. The terminals 402, 404, 406, 408 comprise the same input and output units as the terminals 102, 104, 106, 108 of FIG. 1.

In contrast with the system 100 of FIG. 1, each one of the terminals 402, 404, 406, 408 comprises a monitoring unit 430 for locally deriving activity information about the associated user. The monitoring unit 430 performs the following steps. At the beginning of a session, at each terminal 402, 404, 406, 408 a timer is set that triggers every second. The audio input data is analyzed and it is determined whether the user is talking or is silent by a talking time counter. At the same time, at each terminal 402, 404, 406, 408 a key stroke counter counts the number of key strokes.

The client terminals 404, 406, 408 further comprise a sending unit 432 for sending the derived activity information to the facilitator terminal 402. The facilitator terminal 402 further comprises a receiving unit 434 for receiving the activity information from the remote users. When the timer triggers, each client terminal 404, 406, 408 collects the key stroke count and the talking time count, sends this activity information (together with a time-stamp) to the facilitator terminal 402 and resets the counters. The facilitator terminal 402 further comprises a display unit for displaying the remote users in respective windows having window properties, and for manipulating the window properties on the basis of the remote user activity information.

Alternatively, each terminal 402, 404, 406, 408 comprises a receiving unit and a display unit for respectively receiving and displaying remote user activity information from the remote users. In a way, all the participants to the session are then equivalent, as each terminal 402, 404, 406, 408 derives and distributes local user activity information for display at the remote terminals.

Figure 5:
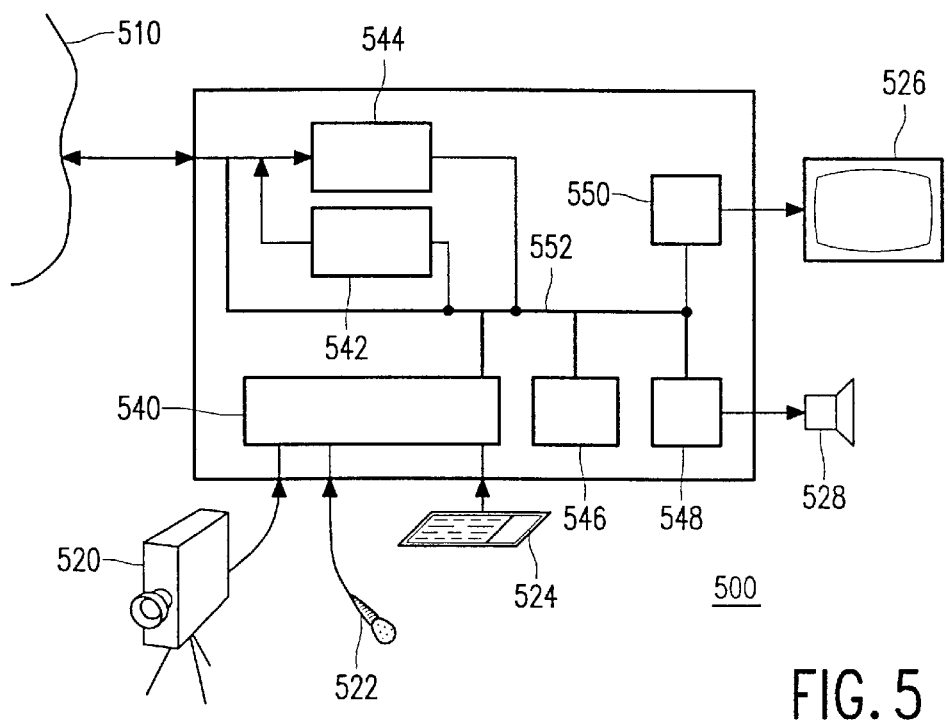
FIG. 5 shows an embodiment of a terminal in accordance with the invention.

FIG. 5 shows a terminal 500 for implementing an embodiment of the invention. The terminal 500 is an implementation of the facilitator terminal 402 of FIG. 4. The terminal 500 is connected via a network 510 with a number of remote client terminals, not shown in FIG. 5. The terminal 500 comprises as input unit a camera 520, a microphone 522 and a keyboard 524 for enabling the associated facilitator to supply input data in the form of video, audio and text. The terminal 500 further comprises a display 526 and a speaker 528 for producing video and audio data originating from users at the remote terminals.

The terminal 500 further comprises a monitoring unit 540 for deriving user activity information from the incoming input data. As the remote terminals are assumed to comprise monitoring units themselves, the monitoring unit 540 is only used for deriving local user activity information, i.e. activity information about the facilitator. The terminal 500 further comprises a sending unit 542 for sending the local input data to the remote terminals and a receiving unit 544 for receiving remote input data and remote user activity information from the remote terminals.

Alternatively, the receiving unit 544 is arranged for receiving remote input data only, whereas the monitoring unit 540 derives not only local user activity information, but also remote user activity information from the received remote input data. In the latter case, performing the method of the invention only requires one terminal in accordance with the invention, the client terminals being prior art terminals.

The input data, both local and remote, are presented to the facilitator by means of the speaker 528 and the display 526 which are driven by an audio processing unit 548 and a display manager 550, respectively. Furthermore, the display 526 and the display manager 550 are arranged to visualize the activity information in one of the ways as described in connection with FIG. 1 and FIG. 4. The various previously described parts of the terminal 500 are interconnected and controlled via a bus 552 and a microprocessor 546, respectively.

Displaying windows on a computer display is the standard approach in audio-visual communication systems. In systems based on consumer television and video walls, a picture-in-picture (PIP) approach could be used instead.

Figure 6:
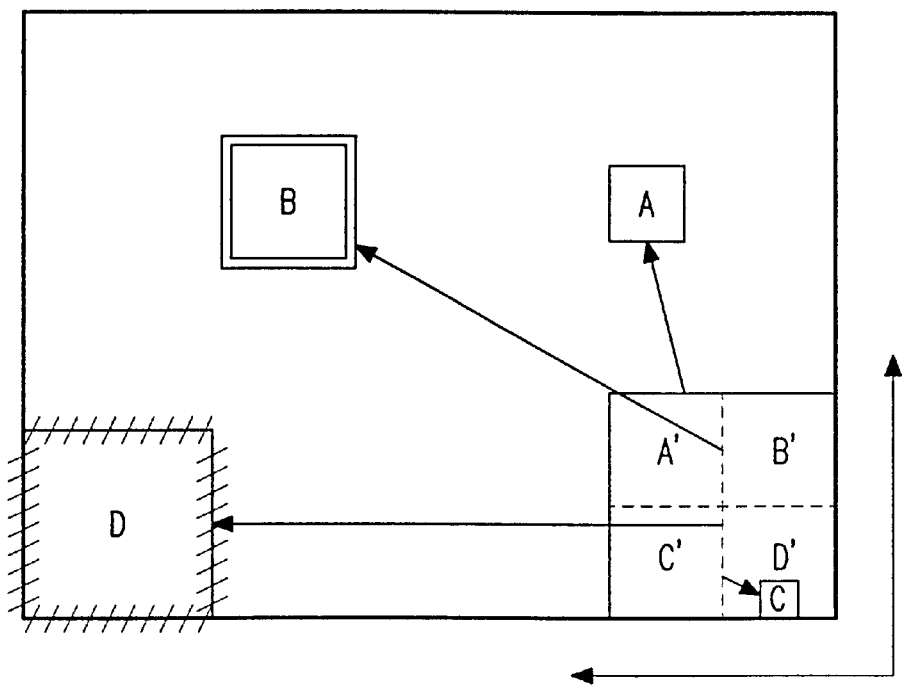
FIG. 6 shows a display image from a terminal in accordance with the invention.

FIG. 6 shows a display image from the terminal of the invention. Views of four participants are shown in respective windows A, B, C, D. The windows A, B, C, D are either ordinary windows on a computer monitor or PiPs. The background could be used for displaying a group view or other relevant images. Initially, at the start of the communication session, the windows were in locations A', B', C', D' at the bottom right. During the session several windows parameters have changed in consequence of the received activity information. Firstly, windows corresponding to talkative participants have gradually moved upward. Secondly, windows corresponding to participants that are using the keyboard have gradually moved to the left. Thus it is easy for a participant or a facilitator to know who is doing the talking and who is doing the typing.

By changing the location of the windows on the display, aspects of the contributions of the participants can be visualized. The facilitator is relieved from the task of constantly monitoring the participants. This would even enable him to monitor several sessions in parallel.

Further window properties that could be used advantageously for visualizing the activity information are window size (aspect ratio), image frame rate, image resolution, window border color, background color, brightness, special effects etc. By using a 3D display, the activity information could also be visualized by moving the windows along a third dimension. Visualizing the activity information by means of manipulating the window properties has the advantage, as compared to simply putting the activity information in graphs and tables, that it requires no effort to link the visualized activity information to the relevant participant. Moreover, in this way an instant account is given of what has happened up to a certain moment during a session.

In the display image of FIG. 6 only keyboard activity and taking time are visualized. Numerous other sources for activity information can be imagined, such as mouse movements and mouse button clicks. Different semantics of the audio data can be used as activity information. The simplest audio-based activity information is a binary indication for each user indicating silence or speech activity. More information can be gained by an indication of the volume of audio. Another basis for activity information could be the number of words generated by a participant during a talk spurt. The audio data could be analyzed in order to recognize uncertainty, hostility, etc.

More elaborate, though feasible, is analyzing the video data. For example, activity information could be based on specific gestures such as nodding, etc. When use is made of MPEG or H.261 compression techniques, motion vectors could be analyzed for recognizing such gestures. Also image processing techniques could be used to obtain the same result.

The activity information can also be derived from the input data in a context dependent fashion. For example, if during the session use is made of a particular software application, only particular application specific commands or mouse movements could be regarded as activity information, etc. Groupware systems often comprise a floor control module for controlling access to applications. This floor control module could also generate activity information in the form of an indication which participant is in control of which applications. Also the position of a participant in the context of an application is a source of activity information. For a shared web application activity information could be related to the URL (Uniform Resource Locator) the participant is accessing at a certain moment. For a text editor or a shared workspace it can be the number of the page the user is currently viewing.

Figure 7:
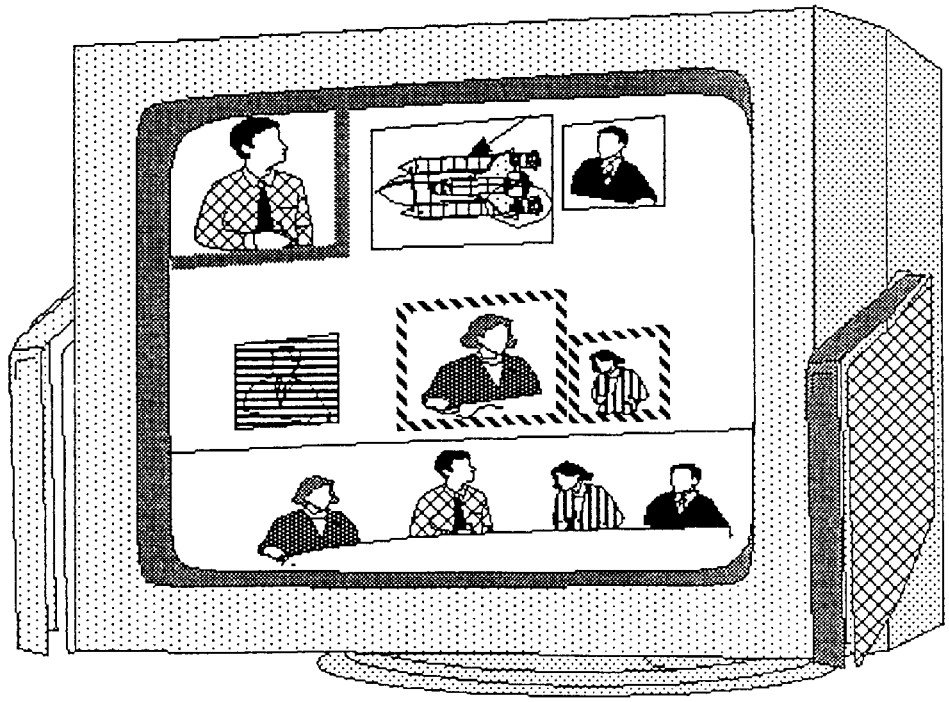
FIG. 7 shows a further display image from a terminal in accordance with the invention.

FIG. 7 shows a further display image from the terminal of the invention. In this example, a facilitator monitors a group of participants being located in the same room. In such a set-up, the method of the invention can be applied in several ways. Firstly, it could be imagined that each participant has a respective client terminal at his disposal. This is essentially the same as the situation in which the participants are all located at different locations. Secondly, it could be imagined that besides the facilitator terminal only a single client terminal is used. That client terminal should be capable of capturing audio and video data from a group consisting of a plurality of participants. Anyway, on the display at the facilitator terminal the contributions of the participants can be visualized in the way already described.

In the example of FIG. 7, in the lower part of the display, a group view is displayed. The group view is either obtained from a single terminal (e.g. wide angle view), or the group view is synthesized from input data obtained by a plurality of terminals, each one of which being associated with a single participant. The group view grows to dominate the display when none is talking. The group view also enables to characterize the group visually as a whole, for example, as coordinated, divided or disperse, hostile, passive or responsive.

Also the individual participants are displayed in respective windows that are manipulated as explained with respect to FIG. 6. The individual views can be either cut from a collective image from the single terminal or are captured by the plurality of terminals. The individual frame rates are higher for the leading participants, whereas those who are inactive would literally freeze. Customization is possible so that users can choose how to visualize information, but users will not need to operate the display manually. Furthermore, at the top center, discussion material is presented.

While the invention has been explained by means of embodiments relating to a videoconferencing environment, application of the invention to a (multi-person) telephonic conference is by no means excluded.

It should be noted that the above-mentioned embodiments illustrate rather than limit the invention and that those skilled in the art will be able to design many alternative embodiments without departing from the scope of the appended claims. In the claims, any reference signs placed between parentheses shall not be construed as limiting the claim. The invention can be implemented by means of hardware comprising several distinct elements, and by means of a suitably programmed computer. In a device claim enumerating several means, several of these means can be embodied by one and the same item of hardware.

What is claimed is:

1. A communication method using at least two interconnected terminals having a keyboard, the method comprising the steps of:
    collecting input data from a participant associated with one of said at least two interconnected terminals, said input data comprising at least video and key activation of the participant; and
    deriving activity information about the participant from the video and key activation data;
    wherein a cumulative contribution by the participant is created and stored, and the activity information derive includes a visual indication as to whether the activity comprises a monologue by a single participant, a dialog between two participants, a lively discussion between a plurality of participants, and an argument between the plurality of participants.

2. A method as claimed in claim 1, further comprising the step of visualizing the activity information in the form of a table and/or a diagram.

3. A method as claimed in claim 1, further comprising the steps of:
    displaying the participant on a display means in a window having window properties; and
    manipulating the window properties on the basis of the activity information.

4. A method as claimed in claim 1, wherein said activity information deriving step comprises the step of measuring activity of the participant.

5. A method as claimed in claim 1, wherein said activity information deriving step comprises the step of counting a number of input device operations made by the participant.

6. A method as claimed in claim 1, wherein said at least two interconnected terminals comprise a facilitator terminal (402) and at least one client terminal, and said activity information deriving step comprises the steps of obtaining said activity information at the at least one client terminal, and sending said activity information to the facilitator terminal.

7. A terminal for use in a communication system having a keyboard, the terminal comprising:
    input means for enabling a user to supply input data comprising at least video and key activation data of the user; and
    monitoring means for deriving user activity information from the video and keyboard activation data, wherein said monitoring means derives whether the activity information comprises a monologue by a single participant, a dialog between two participants, a lively discussion between a plurality of participants, and an argument between the plurality of participants, wherein a cumulative contribution by the participant is created, and includes a visual indication the type of activity information derived.

8. A terminal as claimed in claim 7, further comprising sending means for sending the user activity information to a remote terminal.

9. A terminal as claimed in claim 7, further comprising receiving means for receiving user activity information from a remote terminal.

10. A terminal as claimed in claim 7, further comprising display means for visualizing the user activity information in the form of a table and/or a diagram.

11. A terminal as claimed in claim 7, further comprising display means for displaying a user in a window having window properties, and for manipulating the window properties on the basis of the user activity information.

12. A communication method using at least two interconnected terminals having a keyboard, the method comprising:
    collecting input data from a participant associated with one of said at least two interconnected terminals, said input data comprising at least video, key activation and/or audio properties; and
    manipulating the displayed window properties on the basis of the activity information, wherein the visual indication includes an indication as to whether the activity comprises a monologue by a single participant, a dialog between two participants, a lively discussion between a plurality of participants, and an argument between the plurality of participants, wherein a cumulative contribution by the participant is created.

13. A method as claimed in claim 12, further comprising visualizing the activity information in the form of at least one of a table and a diagram.

14. A method as claimed in claim 12, wherein said activity information deriving comprises measuring talking time of the participant.

15. A method as claimed in claim 12, wherein said activity information deriving comprises counting a number of input device operations made by the participant.

16. A method as claimed in claim 12, wherein said at least two interconnected terminals comprise a facilitator terminal and at least one client terminal, and said activity information deriving comprises obtaining said activity information at the at least one client terminal, and sending said activity information to the facilitator terminal.

17. A terminal for use in a communication system having a keyboard, the terminal comprising:
    an input configured to enable a user to supply input data comprising at least video, key activation and/or audio data;
    a monitoring device configured to derive user activity information form the input data; and
    a display configured to display a user in a displayed window having window properties, and configured to manipulate the displayed window properties on the basis of user activity information, wherein the user activity information includes tracking whether there is a monologue by a single participant, a dialog between two participants, a lively discussion between a plurality of participants, and an argument between the plurality of participants, wherein a cumulative contribution by the participant is created.

18. The terminal of claim 17, further comprising a sending device configured to send the user activity information to a remote terminal.

19. The terminal of claim 17, further comprising a receiver configured to receive user activity information from a remote terminal.

20. The terminal of claim 17, wherein said display device is configured to visualize the user activity information in the form of at least one of a table and a diagram.

21. The terminal of claim 17, wherein the displayed window properties are at least one of the displayed windows size, position, and resolution.

22. The terminal of claim 17, wherein the displayed window properties are at least one of the refresh rate of the displayed window, the displayed windows color, and the displayed windows brightness.

23. The terminal of claim 17, wherein the display is configured to display windows in a three-dimensional space and the displayed window property is the displayed windows position within the three-dimensional space.

24. The terminal of claim 17, wherein said activity information is at least one of the participants gestures, the participants keyboard activity, and the participants mouse activity.

* * * * *